FIG.14

INVENTOR.
AMEDEO INCONTRI CAPPELLA
BY
George P. Ziehmer
ATTORNEY

Oct. 25, 1966   A. I. CAPPELLA   3,280,707
METHOD OF AND APPARATUS FOR PRODUCING CONVOLUTELY
WOUND CONTAINER BODIES
Filed March 11, 1964   6 Sheets-Sheet 6

INVENTOR.
AMEDEO INCONTRI CAPPELLA
BY
George P. Ziehmer
ATTORNEY

United States Patent Office

3,280,707
Patented Oct. 25, 1966

3,280,707
METHOD OF AND APPARATUS FOR PRODUCING CONVOLUTELY WOUND CONTAINER BODIES
Amedeo Incontri Cappella, York, Pa., assignor to American Can Company, New York, N.Y., a corporation of New Jersey
Filed Mar. 11, 1964, Ser. No. 351,120
15 Claims. (Cl. 93—81)

The present invention relates to a method of and apparatus for producing convolutely wound container bodies and has particular reference to producing such bodies of a configuration other than round or cylindrical.

Convolutely wound container bodies usually are made from flat blanks of fibre or other suitable materials which may be pre-cut as to size or may be cut from a substantially continuous strip of such material as it is fed into the body forming machine.

The blank or the strip as fed into the body forming machine receives an adhesive coating on one surface thereof and is then convolutely wound upon a rotating mandrel to shape and size the resulting container body. Usually the tail or terminal end of the blank must be layed down against the container body by a pressure applied thereto to effectively adhere this terminal end to the body and to thereby produce a smooth exterior surface. This layng down operation usually is effected by an ironing or pressure element which rides on the outer surface of the body on the rotating mandrel.

In the manufacture of convolutely wound bodies of a configuration other than round or cylindrical bodies, such as rectangular, oval, oblong or other irregular shape, the lay-down pressure element vibrates considerably and thereby sets up such a harsh bumping action that the speed of production of the entire machine must be reduced to approximately one-third the speed of production for round bodies. This greatly increases the cost of convolutely wound irregular shaped bodies.

It is an object of the instant invention to overcome this difficulty by the provision of a method of and apparatus for producing convolutely wound container bodies of irregular configuration at substantially the same speed of production as for round bodies so as to reduce the cost of manufacturing irregular shaped bodies.

Numerous other objects and advantages of the invention will be apparent as it is better understood from the following description, which, taken in connection with the accompanying drawings, discloses a preferred embodiment thereof.

In order to provide for this increased speed of production and reduction in cost, the instant invention contemplates a method of and apparatus for rotating a body at top speed during its winding operation and for rotating the same body at a lesser speed during the terminal end lay-down operation. This is effected by providing a split or two part mandrel which extends through a plurality of stations in the apparatus and which comprises a winding mandrel which is rotated at top speed and a continuing lay-down mandrel which is rotated at a lesser speed, preferably about half of the winding speed.

In such an apparatus, the body is transferred from one part of the mandrel to the other part for the different operations. Hence the apparatus may be kept operating at top or winding speed with a body being wound at one station at this top speed while a lay-down operation is simultaneously being performed at a reduced speed on a previously wound body at a subsequent station. The invention also contemplates extending the application of these features to other slow operations such as labeling the wound bodies, etc.

Referring now to the drawings.

As a preferred and exemplary embodiment of the instant invention, the drawings disclose the method steps and one form of apparatus for carrying out these steps to produce a convolutely wound fibre, tubular container body of rectangular configuration and having a wrap-around label applied thereto.

The method of producing such a container body comprises the steps of feeding a flat body blank or a strip of flat material from which a blank may be severed to a rotatable winding mandrel 21 (FIG. 1) extending through a winding station 22, gripping one end of the blank or strip in the mandrel and then rotating the mandrel at a given speed to wind or wrap the blank or strip around the mandrel in a convolute fashion to produce a convolutely wound tubular container body A (FIGS. 9 and 12) of one or more layers or thicknesses of body material with the terminal or tail end B (dotted lines in FIG. 9) of the blank in position to overlap the wound body.

The blank on its outer face carries a tacky adhesive which may be preapplied to individual blanks or may be applied to the strip as it is fed to the mandrel. This adhesive bonds together the layers or thicknesses of the wound body. Where a strip is fed to the mandrel as shown in the drawings, the strip is wound around the mandrel first and is then severed to leave a body formed from a blank of proper length on the mandrel.

Figures 8, 9, 10, 11, 12, 13:
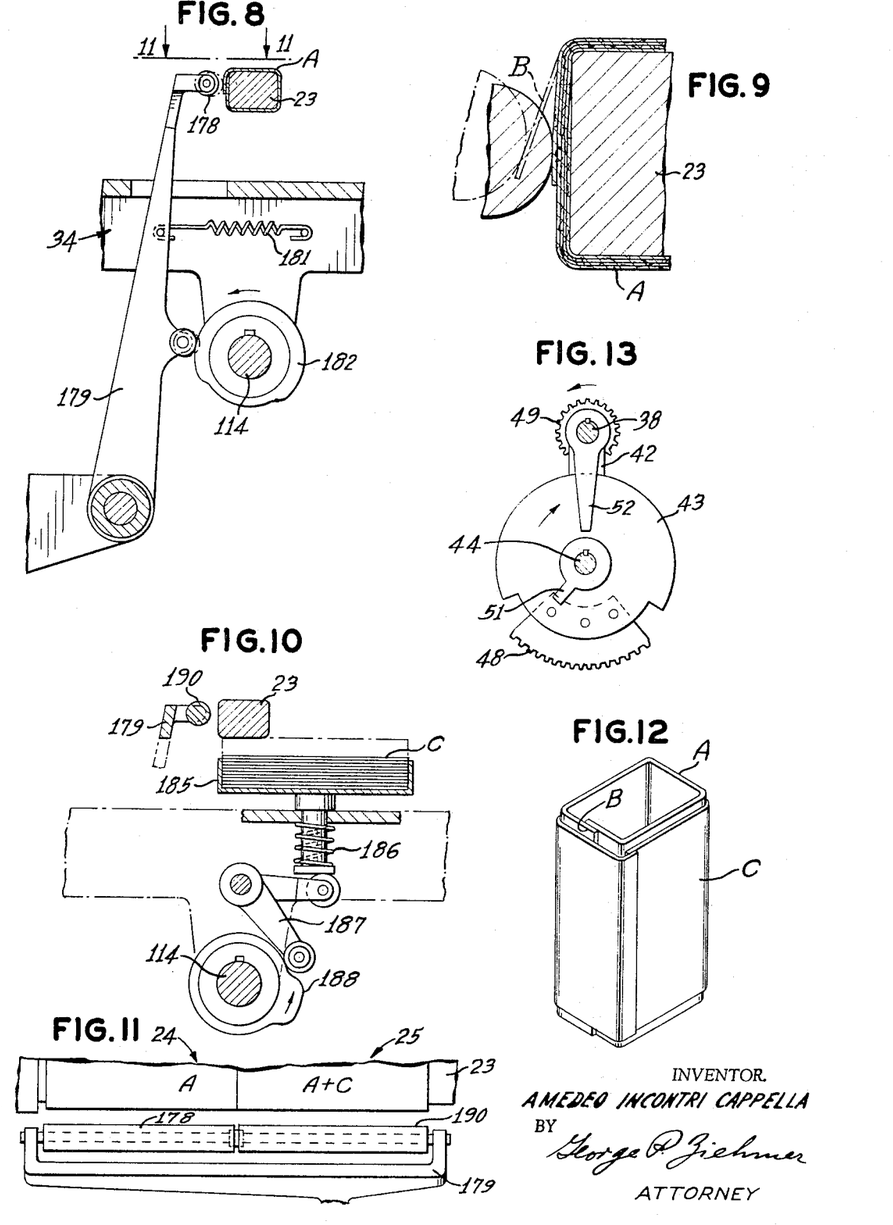
FIG. 8 is an enlarged sectional view taken substantially along the broken line 8—8 in FIG. 1, with parts broken away.
FIG. 9 is a greatly enlarged fragmentary sectional view of a convolutely wound container body on a mandrel and the lay-down element, showing how the tail end of a blank is layed down.
FIG. 10 is an enlarged sectional view of a labeling mechanism as taken substantially along the broken line 10—10 in FIG. 1, with parts broken away.
FIG. 11 is an enlarged fragmentary top plan view as taken substantially along the line 11—11 in FIG. 8.
FIG. 12 is an enlarged perspective view of a container body made in accordance with the instant method invention and by the instant apparatus, the body showing only one thickness of body material for simplification and also showing a label applied thereto.
FIG. 13 is a sectional view taken substantially along the line 13—13 in FIG. 1.

At the termination of the body winding operation, the wound body is pushed endwise along the mandrel 21 out of the winding station and is thereby transferred to a separate but continuing auxiliary mandrel 23 (FIG. 1) extending through a laydown station 24. This auxiliary mandrel is separately rotatable at a speed less than the speed of rotation of the winding mandrel, preferably about one half the speed. At this station a pressure is exerted against the wound body as the mandrel rotates at its slow speed and the free tail end of the blank is engaged and pressed tightly against the body as shown in FIG. 9 to effect a bond therewith to produce a substantially smooth outer surface for the body.

During the transfer of the wound body from one station to the other, the mandrels are brought to rest and are in end-wise alignment.

Thus, in such a method of producing a convolutely wound body, the winding operation takes place on one mandrel and simultaneously with this operation, a laydown operation is performed on a previously wound body disposed on a connected mandrel operating at a slower speed. The slower operation thereby in no way interferes with the faster winding operation and hence body production proceeds at the faster rate of speed of the winding operation.

This method contemplates the inclusion of other slow operations required in completing the body and hence extends to the application of a label to the adhesive coated outer surface of the wound body. For this purpose the auixilary mandrel extends through a labeling station 25 (FIG. 1) where one end of a label C (FIG. 12) is pressed against the wraped body A as shown in FIG. 10 and during the rotation of the mandrel, is wrapped around the body and pressed tightly thereagainst by pressure elements to bond the label to the body.

Figure 1:
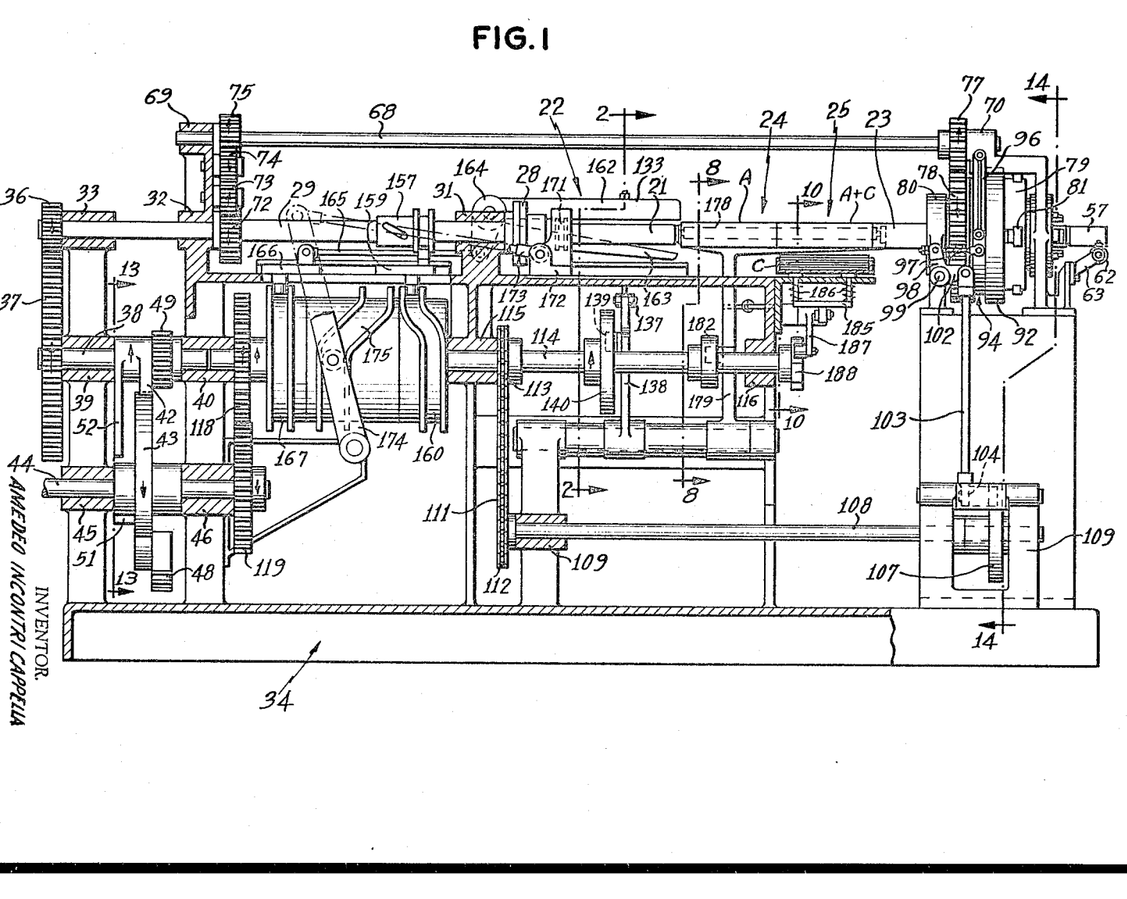
FIG. 1 is a longitudinal sectional view of an apparatus embodying the instant invention and which may be utilized in carrying out the steps of the instant method invention.

One form of apparatus for carrying out the method steps of the instant invention is shown in the drawings and includes, the winding mandrel 21 and the auxiliary mandrel 23 and the winding, lay-down and labeling stations 22, 24, 25 respectively (see FIG. 1).

In this apparatus the mandrels 21, 23 are of rectangular shape to produce a rectangular tubular container body and are disposed in horizontal and end-to-end relation as shown in FIG. 1. The winding mandrel 21 is a short mandrel extending through the winding station 22 and having on one end a flange 28 (see also FIGS. 3 and 4) connected to a long spindle 29 carried in spaced bearings 31, 32, 33 (FIG. 1) of a frame 34 which constitutes the main frame of the apparatus.

The spindle 29 and hence the winding mandrel 21 are rotated periodically through a cycle of one or more revolutions depending upon the required number of thicknesses of the material desired in the container body A. In the drawings, FIG. 9 shows a body A as having four (4) thicknesses of material. Hence the spindle and its connected mandrel rotate four times for each cycle.

The rotation of the spindle 29 is effected through a spur gear 36 (FIG. 1) which is mounted on the outer end of the spindle and which meshes with a driving gear 37 carried on a short shaft 38 journaled in bearings 39, 40 in the main frame. The short shaft 38 is rotated cyclically through a continuously rotating Geneva indexing device comprising a locking member 42 (see also FIG. 13) on the shaft 38 and a disc 43 mounted on a main driving shaft 44 journaled in bearings 45, 46 in the frame. The main driving shaft 44 is rotated continuously in any suitable manner.

The Geneva disc 43 carries a segment gear 48 which through each revolution of the disc meshes with a pinion 49 and thus rotates the shaft 38 through a predetermined number of revolutions. In order to facilitate proper meshing of the segment gear 48 with the pinion 49 a lug 51 projecting from the disc 43 is provided for engagement with a pinion starting finger 52 on the shaft 38.

Figures 3, 4, 5, 6, 7:
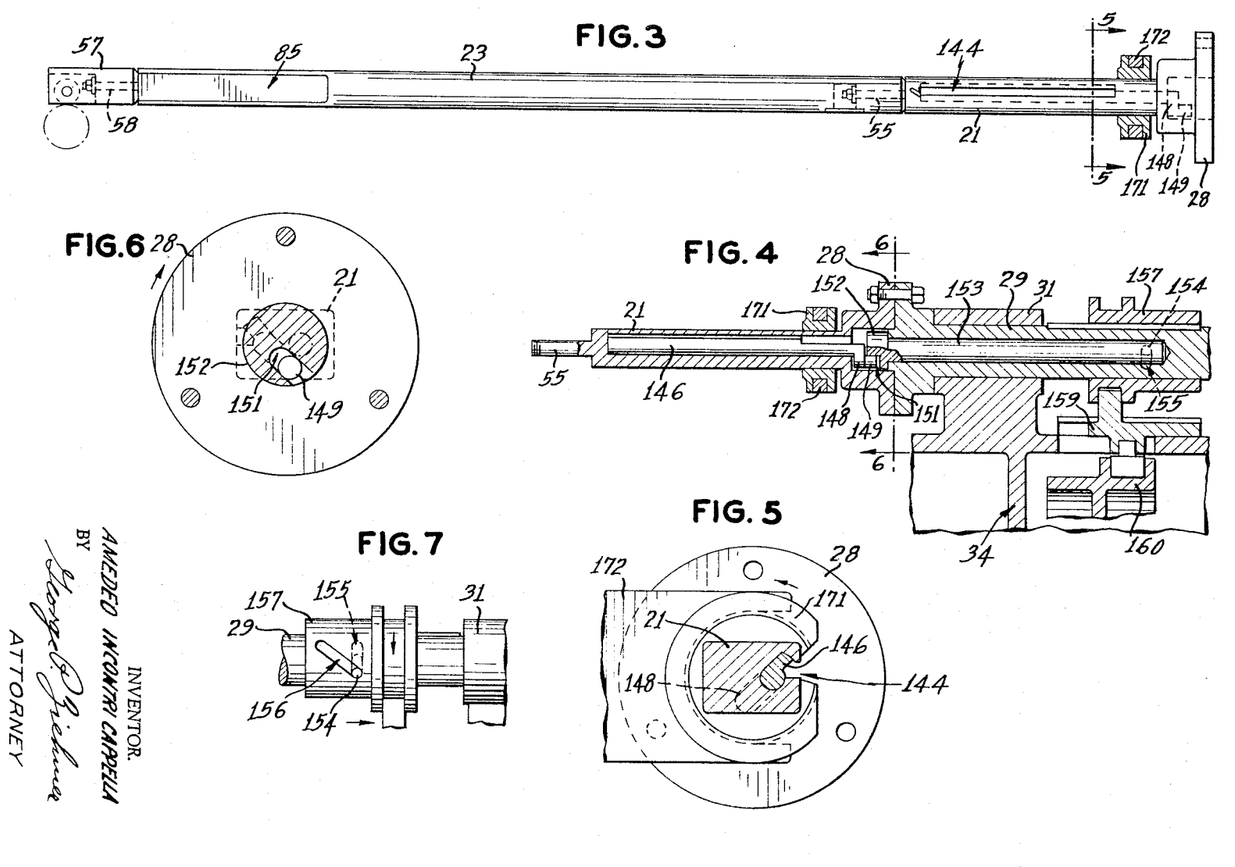
FIG. 3 is an enlarged elevational view of a portion of the mandrel shown in FIG. 1, the view showing the mandrel reversely disposed.
FIG. 4 is a sectional view of the portion of the mandrel at the right in FIG. 3 and a connected continuing portion with certain operating devices connected therewith, parts being broken away.
FIG. 5 is an enlarged sectional view taken substantially along the line 5—5 in FIG. 3.
FIG. 6 is an enlarged sectional view taken substantially along the line 6—6 in FIG. 4.
FIG. 7 is an elevational view of the portion of the mandrel at the right in FIG. 4 with parts broken away.

The auxiliary mandrel 23 is a long mandrel extending through the lay-down and labeling stations 24, 25 and projecting beyond to the discharge end of the apparatus as shown in FIGS. 1 and 3. This auxiliary mandrel 23 is a separate continuation of the winding mandrel 21 and adjacent the winding mandrel is rotatably supported on and is connected to a trunnion 55 (FIGS. 3 and 4) projecting from the end of the winding mandrel.

Figure 17:
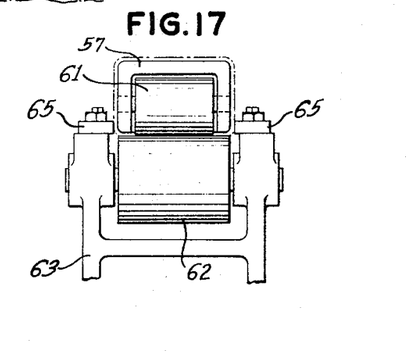
FIG. 17 is an end elevational view as taken substantially along the line 17—17 in FIG. 15, with parts broken away.

At its discharge end, the auxiliary mandrel 23 is rotatably supported by and is connected to a nonrotatable, floating support horn 57 (FIGS. 3 and 15) which is formed as a continuation of the mandrel and is freely supported to permit completed bodies to pass along and over it without interference. For this purpose, the mandrel 23 is provided with a trunnion 58 which extends into the horn 57 and is held against displacement by a nut 59. The horn 57 houses a freely mounted roller 61 (see also FIG. 17) which rides on a freely mounted support roller 62 carried in a bracket 63 secured to the main frame 34. The horn 57 is laterally retained in position by a pair of eccentrically mounted adjustable guide rollers 65 carried on the bracket 63 and disposed one on each side of the horn with sufficient clearance to permit a labeled container body to pass along the horn.

The auxiliary mandrel 23 is rotated in time with the winding mandrel 21 and at a reduced speed, preferably as mentioned hereinbefore at substantially one half the speed of the winding mandrel. This rotation is effected through a driving shaft 68 which is disposed above the mandrels 21, 23 in parallelism therewith and with its ends journaled in bearings 69, 90 formed in the main frame 34.

Figure 14:
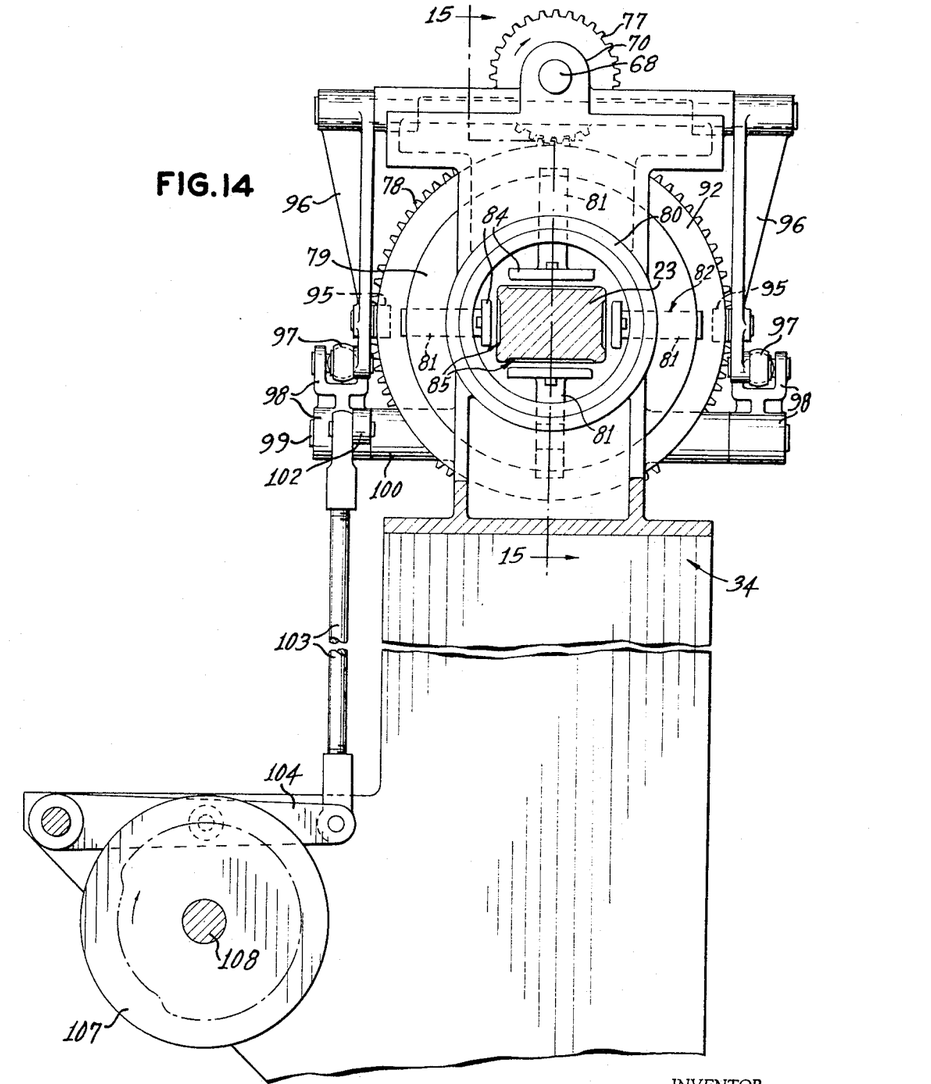
FIG. 14 is a sectional view taken substantially along the broken line 14—14 in FIG. 1, with parts broken away.

The auxiliary mandrel driving shaft 68 is driven from the winding mandrel spindle 29. For this purpose the spindle 29 carries a gear 72 (FIG. 1) which rotates a train of gears comprising a pair of idler gears 73, 74 mounted on the frame 34 and a gear 75 secured to the driving shaft 68. At its opposite end, at the right as viewed in FIG. 1, the driving shaft 68 carries a gear 77 (see also FIGS. 14 and 15) which meshes with a gear 78 secured to a rotatable drum 79 disposed axially of and surrounding the discharge end of the auxiliary mandrel 23 in radially spaced relation thereto. This drum 79 is journaled for rotation in bearings 80 in the main frame 34.

The drum 79 is provided with four radially disposed slides 81 (FIGS. 14 and 15) mounted in radial slideways 82 formed in the drum and spaced 90 degrees apart. The inner ends of these slides are formed with elongated pads 84 which normally are spaced away from the auxiliary mandrel 23 but which when in operating position engage into flat recesses 85 formed in the flat sides of the rectangular shaped auxiliary mandrel to clamp the mandrel in a centralized position as to rotate it as mentioned hereinbefore.

Figure 15:
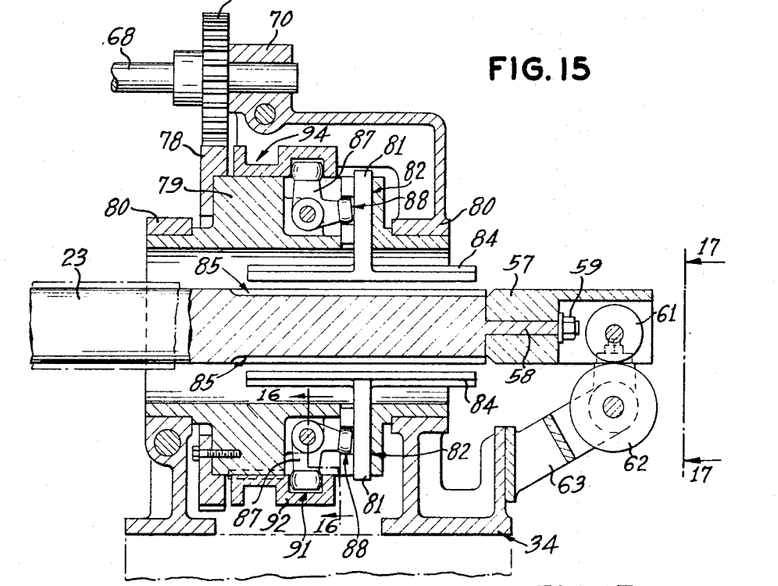
FIG. 15 is a sectional view taken substantially along the broken line 15—15 in FIG. 14.
Figure 16:
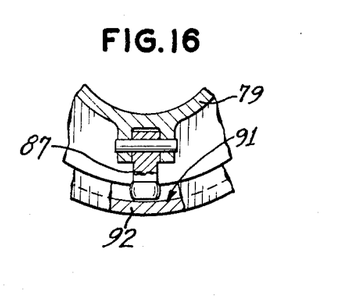
FIG. 16 is a sectional view taken substantially along the broken line 16—16 in FIG. 15, with parts broken away.

The driving pads 84 are moved into and out of operating position by bell cranks 87 pivotally mounted in the drum, one adjacent each slide 81 and having one leg engaging in a groove 88 in the slide as best shown in FIG. 15. The other leg of all of the bell cranks 87 are engaged in an annular inner groove 91 of a collar 92 (see also FIG. 16) slidably mounted on and surrounding the drum 79. Sliding movement of the collar 92 axially of the drum rocks the bell cranks 87 and radially shifts the slides 81 and their driving pads 84 into and out of driving relation to the auxiliary mandrel 23.

Sliding movement of the collar 92 preferably is effected by cam action. For this purpose the collar 92 is provided with an annular groove 94 having a pair of diametrically opposed rollers 95 (FIG. 14) carried on lever arms 96 pivotally mounted on the main frame 34. The free ends of the lever arms 96 are connected by yieldable spring backed links 97 (FIG. 1) to a pair of levers 98 mounted on a pivot shaft 99 journaled in a long cross bearing 100 (FIG. 14) in the main frame 34. One of the levers 98 is formed with an arm 102 which is connected by a link 103 to a pivotally mounted cam arm 104. The cam arm 104 carries a cam roller which operates in a suitable cam groove in a continuously rotating face cam 107.

The cam 107 is mounted on one end of a horizontal operating shaft 108 (FIG. 1) which is journaled in a pair of spaced bearings 109 in the main frame 34. The shaft 108 is driven continuously by a chain 111 which operates over a sprocket 112 on the shaft 108 and over a sprocket 113 mounted on a cam shaft 114 journaled in the bearing 40 and in a pair of other bearings 115, 116 in the main frame 34. The cam shaft 114 is rotated continuously directly from the main shaft 44 through a pair of meshing gears 118, 119 mounted on these shafts.

Through the connections above described, it is evident that the main driving shaft 44 rotates the winding mandrel 21 and the auxiliary mandrel 23 simultaneously but at different speeds of rotation as hereinbefore mentioned. This simultaneous rotation is effected through a single cycle of a predetermined number of revolutions of the winding mandrel and at the termination of this cycle both mandrels come to rest in radial alignment so as to facilitate the transfer of a wound body from one mandrel to the other. The mandrels are also in radial alignment with the support horn 57 at the discharge end of the apparatus to permit discharge of a completed body from the apparatus. After each rest period, the cycle of operation is repeated.

Figure 2:
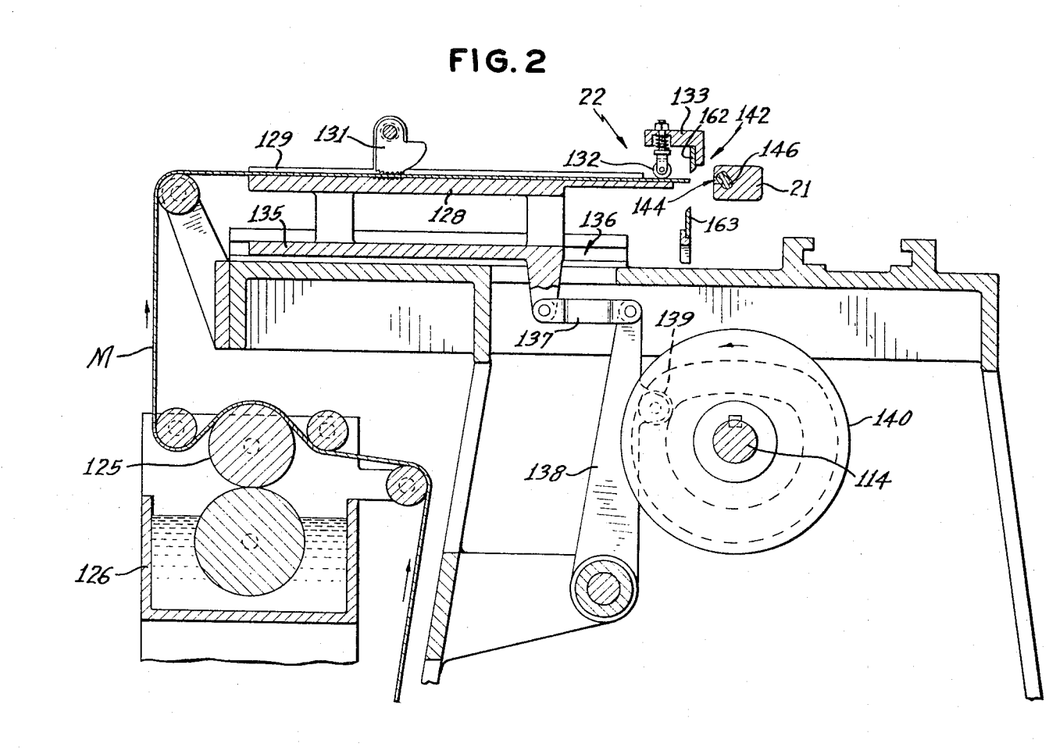
FIG. 2 is an enlarged transverse sectional view of the apparatus shown in FIG. 1, the view being taken substantially along the broken line 2—2 in FIG. 1.

The container bodies produced in the instant apparatus preferably are formed from a substantially continuous web or strip M (FIG. 2) of material which is fed toward the winding mandrel 21 at the winding station 22. The strip M upon entering the apparatus threadedly passes over a plurality of guide rollers including a glue applying roller 125 of an adhesive bath 126 which applies a film of adhesive to what will be the upper or outer surface of the strip as it is fed through the winding station as shown in FIG. 2.

At the winding station 22 the strip M is supported on a flat horizontal runway 128 with the adhesive coated surface of the strip facing upwardly. Side guides 129 along both sides of the runway retain the strip in position against lateral displacement. The strip is also held down against the top of the runway 128 by a weighted pivotally mounted clamping pawl 131 and a pressure roller 132 yieldably mounted in a bracket 133 disposed adjacent the winding mandrel 21 and projecting outwardly from the bearing 31 of the main frame 34, (see FIG. 1).

The runway 128 is movable toward and away from the winding mandrel 21 through a feeding stroke and thence through a return stroke to feed the strip to the mandrel. For this purpose the runway is formed on a slide 135 (FIG. 2) which operates in a horizontal slideway 136 in the main frame 34. The slide is reciprocated in time with the other moving parts of the apparatus by a link 137 which connects the slide with an upright cam arm 138 pivotally mounted on the main frame. The arm 138 carries a cam roll 139 which operates in a cam groove of a continuously rotating face cam 140 carried on the cam shaft 114 (see FIG. 1).

On the forward or feeding stroke of the runway 128 (toward the right as viewed in FIG. 2) the weighted clamping pawl 131 holds the strip M clamped against the runway and hence the strip advances with the runway. This movement of the runway carries the forward or leading end of the strip M through and beyond a cut-off device 142 (FIG. 2) at the winding station 22 and deposits the strip end into a recess 144 (see also FIGS. 3 and 5) in the winding mandrel 21 preparatory to gripping the end of the strip and winding a predetermined length of the strip onto the mandrel. This feeding of the strip end into the winding mandrel is effected while the mandrel is at rest.

The gripping of the leading end of the strip M in the winding mandrel 21 is effected by an oscillatable gripper bar 146 (FIGS. 2, 4 and 5) which operates in a long open sided bearing formed in the winding mandrel immediately adjacent the recess 144. The normal position of the gripper bar 146 is shown in FIG. 5.

When the leading end of the strip M is inserted into the recess 144 of the mandrel, the gripper bar 146 oscillates in a clockwise direction as viewed in FIG. 5 and thereby clamps and grips the leading end of the strip against a portion of the mandrel defining the recess 144. This gripping action is effected by cam action in time with the winding cycle. For this purpose one end of the gripper bar 146 (at the right in FIG. 4) is formed with a pivot arm 148 movable within an enlarged opening in the winding mandrel 21.

The pivot arm 148 carries an actuating pin 149 (FIGS. 4 and 6) which is engaged in a slot 151 formed in a head 152 on an actuating rod 153 bearing in the spindle 29. The rod 153 carries a pin 154 (see also FIG. 7) which projects radially through a circumferential slot 155 in the spindle and engages in a helical slot 156 in a collar 157 slideably mounted on the spindle 29 and keyed against rotation relative thereto.

Hence as the collar 157 is reciprocated on the spindle 29, it oscillates the rod 153 and the gripper bar 146 to grip and release the leading end of the strip in timed sequence. Reciprocation of the collar 156 is effected by a horizontally disposed slide 159 (FIG. 1) which is reciprocated by a barrel cam 160 mounted on and continuously rotated with the cam shaft 114.

As soon as the gripper bar 146 grips the leading end of the strip M, the winding mandrel 21 starts to rotate through its cycle of operation of a predetermined number of rotations. During this cycle the mandrel pulls the strip M along the runway 128 and convolutely winds the strip into a container body of a desired number of layers or thicknesses of the strip. This pulling of the strip releases the clamping pawl 131 to allow the strip to advance.

At the termination of the winding cycle, the mandrel 21 stops rotating and the wound up body, called the body blank, is cut free of the strip. This cutting action is effected by the cutter device 142 hereinbefore mentioned which comprises a stationary cutter blade 162 (FIGS. 1 and 2) secured to the main frame 34 and a pivoted blade 163, both of which extend across the path of travel of the strip M at the winding station 22.

The pivoted blade 163 is connected to a lever 164 (FIG. 1) and link 165 which connects with a horizontally disposed slide 166 reciprocated in time with the other moving parts of the apparatus by a barrel cam 167 on the continuously rotating cam shaft 114.

Upon the severing of the body blank from the strip M, the weighted clamping pawl 131 swings into clamping position against the strip and holds it in place against displacement from the runway 128 in readiness for a repeat feeding operation. This severing of the body blank leaves the terminal or tail end B (FIG. 9) of the body blank in a free position and now requires laying down against the wound body.

The laying down of the terminal end of the blank is effected at the lay-down station 24 (FIG. 1). Hence while the winding mandrel 21 is still at rest following a cycle of rotation, the wound body blank is shifted or transferred along the winding mandrel 21 to the adjacent auxiliary mandrel 23. This transfer is effected by a pusher head 171 which is slideably mounted on the winding mandrel adjacent its flange 28 (see FIGS. 1, 3, 4 and 5) and which is reciprocated along the winding mandrel at the proper time through a clevis slide 172, link 173 and pivoted lever 174 in connection with a barrel cam 175 on the continuously rotating cam shaft 114.

During a transfer stroke, toward the right as viewed in FIG. 1 and toward the left as viewed in FIGS. 3 and 4, the pusher head 171 engages the wound body blank on the winding mandrel and pushes it longitudinally thereof the length of the mandrel and onto the aligned lay-down section of the auxiliary mandrel 23 where the head leaves the blank in proper position for the lay-down operation.

Upon return of the pusher head 171 to its normal position on the winding mandrel 21, a repeat feeding of the body strip M is effected and a winding up of another body on the winding mandrel takes place. During the winding up of this body, the terminal end B of the previously wound body now on the lay-down mandrel 23, is layed down in place against the wound body as shown in FIG. 9. This lay-down operation is effected by a long roller 178 (FIGS. 1, 8 and 11) which is disposed adjacent the lay-down mandrel in spaced relation thereto and is carried on the upper end of an upright lever 179 pivotally mounted in the main frame 34. The lever 179 is activated by a spring 181 and a cam 182 on the continuously rotating cam shaft 114. The roller 178 moves in against the wound body blank as soon as the mandrels start to rotate during their cycle of rotation and thus wipes or lays down the terminal end of the wound body blank to produce the body A.

Since the rotation of the lay-down mandrel 23 is effected at a slower rate of rotation than that of the winding mandrel, the operation of the lay-down roller 178 is of a gentle nature without any harsh bumping effects.

Upon completion of the lay-down operation, the mandrels 21, 23 come to rest and the bodies along the mandrels are again shifted therealong by the repeat operation of the pusher head 171. During this shifting operation the wound body with its layed-down terminal end is shifted into the labeling station 25 by end-to-end engagement of the bodies. At the labeling station 25 a stack of the labels C is disposed directly under the extension of the lay-down mandrel 23 and in spaced relation thereto as shown in FIG. 10. This stack of labels is supported on a lifter pad 185 which is mounted for vertical movement in the main frame 34 and held in a retracted normal position by a pair of springs 186 (see also FIG. 1). The lifter pad 185 is raised and lowered in time with the other moving parts of the apparatus by a bell crank 187 pivotally mounted in the main frame 34 and actuated by a cam 188 on the cam shaft 114.

During the rest period of the mandrels 21, 23 the lifter pad 185 is raised to contact the top label in the stack with the outer adhesive coated surface of the wound body A at the labeling station 25 as shown in dotted lines in FIG. 10. Upon retraction of the lifter pad the engaged label adheres to the body and upon the next cycle of rotation of the mandrels, the label for its full length is wrapped around the body. This label wrapping operation is effected by a roller 190 which is similar to the lay-down roller 178 and is mounted on the same lever 179 with the roller 178 and in end-wise alignment therewith.

At the termination of this label lay-down or wrapping operation the completed body A plus its label C as shown in FIG. 12 is pushed along the mandrels, during the next rest period of the mandrels, and is pushed over the discharge horn 57 to any suitable place of deposit. This completes the operations of producing a convolutely body A having a surrounding label C.

It is thought that the invention and many of its attendant advantages will be understood from the foregoing description and it will be apparent that various changes may be made in the form, construction and arrangement of parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

What is claimed is:

1. A method of producing convolutely wound container bodies of irregular configuration, comprising the steps of feeding a flat body blank to a winding mandrel, rotating said winding mandrel at a predetermined speed to convolutely wind said blank onto said mandrel, transferring said wound blank to an auxiliary mandrel, and rotating said auxiliary mandrel at a lesser speed than said winding mandrel and simultaneously exerting a pressure against said wound blank to effectively lay down the terminal end of said blank while maintaining the speed of production at the speed of the winding mandrel.

2. A method of producing convolutely wound container bodies of irregular configuration, comprising the steps of providing a winding mandrel and a separate continuing auxiliary mandrel, feeding a flat body blank to said winding mandrel, rotating said winding mandrel at a given speed to convolutely wind said blank onto said mandrel, transferring the wound blank to said auxiliary mandrel, and rotating said auxiliary mandrel at a lesser speed than said winding mandrel while simultaneously exerting a pressure against said wound blank to lay down the terminal end of said blank while maintaining the speed of production at the speed of the winding mandrel.

3. A method of producing convolutely wound container bodies of irregular configuration comprising the steps of providing a winding mandrel and a separate continuing auxiliary mandrel extending through a plurality of working stations, feeding a flat blank to said winding mandrel at one of said stations, rotating said winding mandrel at a given speed to convolutely wind said blank onto said mandrel at said one station, transferring the wound blank to said auxiliary mandrel at another of said stations, rotating said auxiliary mandrel at a lesser speed than said winding mandrel while simultaneously exerting a pressure against said wound blank to lay down the terminal end of said blank, advancing said wound blank along said auxiliary mandrel to still another of said stations, and wrapping a label onto said wound blank while exerting a pressure thereagainst to lay down the terminal end of said label while maintaining the speed of production at the speed of said winding mandrel.

4. A method of producing convolutely wound container bodies of irregular configuration, comprising the steps of providing a winding mandrel and a separate continuing auxiliary mandrel, rotating said mandrels simultaneously at different speeds, said auxiliary mandrel being rotated at a lesser speed than said winding mandrel, convolutely winding a flat body blank on said winding mandrel to produce a partial container body and simultaneously exerting a pressure against a previously convolutely wound body blank disposed on said auxiliary mandrel to lay down the terminal end of said body blank to complete said convolute winding operation while maintaining the speed of production at the speed of said winding mandrel.

5. An apparatus for producing convolutely wound container bodies of irregular configuration, comprising a rotatable winding mandrel of said irregular configuration, a separate rotatable auxiliary mandrel of said irregular configuration, means for rotating said winding mandrel to convolutely wind an adhesive coated body blank into a container body on said winding mandrel, means for transferring said wound body to said auxiliary mandrel, pressure means engageable with said body on said auxiliary mandrel to tightly lay-down the terminal end of said body blank against said wound body, and means for rotating said auxiliary mandrel at a lesser speed of rotation than that of said winding mandrel to effect a gentle operation of said pressure means within the time limit of said winding operation.

6. An apparatus of the character defined in claim 5 wherein there is provided feeding means for feeding a body blank toward said winding mandrel, and gripper means within said winding mandrel to grip the leading end of said fed blank to facilitate winding of said blank on said mandrel.

7. An apparatus of the character defined in claim 6 wherein said feeding means is a blank support movable toward and away from said winding mandrel, and wherein there is provided clamping means for retaining said blank on said support, and means operable in time with the rotation of said winding mandrel for reciprocating said support.

8. An apparatus of the character defined in claim 6 wherein said gripper means is a gripper bar oscillatably mounted in said winding mandrel adjacent a blank end receiving recess in said mandrel, and wherein there is provided means for oscillating said gripper bar in time with the rotation of said winding mandrel.

9. An apparatus of the character defined in claim 6 wherein said body blank is a portion of a substantially continuous strip of body material, and wherein there is provided means for adhesively coating a surface of said strip, and means for severing a body blank from said strip.

10. An apparatus of the character defined in claim 5, wherein said auxiliary mandrel is disposed adjacent said winding mandrel in end-to-end relation thereto and constituting a separate continuation thereof to facilitate transfer of wound bodies from said winding mandrel to said auxiliary mandrel.

11. An apparatus of the character defined in claim 10, wherein there is provided a floating nonrotatable support for said auxiliary mandrel at the discharge end of said auxiliary mandrel to facilitate discharge of wound bodies from said mandrel.

12. An apparatus of the character defined in claim 10, wherein said mandrel rotating means includes an indexing device for effecting cyclic rotation of said mandrels in unison and at differing speeds, and wherein said auxiliary mandrel rotating means includes radially movable members engageable with said auxiliary mandrel and movable in timed relation with said indexing device to rotate said auxiliary mandrel and to stop it at the termination of a cycle of rotation in longitudinal alignment with said winding mandrel to facilitate transfer of the wound body.

13. An apparatus of the character defined in claim 5 wherein said pressure means is a pivotally mounted roller movable toward and away from said auxiliary mandrel, and spring means acting on said roller to yieldably press said roller against the outer surface of a wound body on said auxiliary mandrel to lay down the terminal end of the body blank.

14. An apparatus of the character defined in claim 5 wherein there is provided adjacent said auxiliary mandrel means for feeding a label to a wound body thereon, and means for wrapping said label around said wound body.

15. An apparatus of the character defined in claim 14 wherein said label feeding means is a movable support for a stack of labels, means for moving said support toward said auxiliary mandrel to adhere a portion of a label to said body, and pressure means engageable with said body during rotation of said auxiliary mandrel to wrap said partially adhered label around said body into fully adhered relation thereto.

References Cited by the Examiner

UNITED STATES PATENTS

| | | | |
|---|---|---|---|
| 1,894,259 | 1/1933 | Fluegge | 93—81 |
| 2,259,577 | 10/1941 | Morgan et al. | 93—81 |
| 3,190,195 | 6/1965 | Snyderman et al. | 93—81 |

BERNARD STICKNEY, *Primary Examiner.*